United States Patent
Li et al.

(10) Patent No.: US 8,566,080 B2
(45) Date of Patent: Oct. 22, 2013

(54) METHOD AND SYSTEM FOR PROCESSING TEXT

(75) Inventors: Bin Li, Beijing (CN); Li Qun Pang, Beijing (CN); Zhi Qiang Sha, Beijing (CN); Zhi Bo Zuo, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 820 days.

(21) Appl. No.: 12/770,439

(22) Filed: Apr. 29, 2010

(65) Prior Publication Data
US 2010/0278427 A1 Nov. 4, 2010

(30) Foreign Application Priority Data

Apr. 30, 2009 (CN) .......................... 2009 1 0136952

(51) Int. Cl.
*G06F 17/28* (2006.01)
*G06F 17/25* (2006.01)
(52) U.S. Cl.
USPC ................ 704/6; 704/9; 715/256; 715/259
(58) Field of Classification Search
USPC .......... 715/256, 259; 707/758, 760, 776, 778, 707/674–677, 690; 704/6, 9
See application file for complete search history.

(56) References Cited

U.S. PATENT DOCUMENTS

| | | | |
|---|---|---|---|
| 2002/0143521 A1* | 10/2002 | Call | 704/1 |
| 2002/0165707 A1* | 11/2002 | Call | 704/2 |
| 2004/0029085 A1* | 2/2004 | Hu et al. | 434/178 |
| 2005/0177789 A1* | 8/2005 | Abbar et al. | 715/528 |
| 2005/0182752 A1* | 8/2005 | Rojer | 707/2 |
| 2006/0285746 A1* | 12/2006 | Yacoub et al. | 382/176 |
| 2008/0077570 A1* | 3/2008 | Tang et al. | 707/5 |
| 2009/0276396 A1* | 11/2009 | Gorman et al. | 707/2 |
| 2010/0293451 A1* | 11/2010 | Carus | 715/230 |
| 2011/0112837 A1* | 5/2011 | Kurki-Suonio et al. | 704/235 |

FOREIGN PATENT DOCUMENTS

CN 1811779 A 8/2006

* cited by examiner

*Primary Examiner* — Michael N Opsasnick
(74) *Attorney, Agent, or Firm* — Patents on Demand P.A.; Brian K. Buchheit; Scott M. Garrett

(57) ABSTRACT

The present invention provides a method and system for text processing. The method comprises determining at least a part of characters in a text; dividing the text into a plurality of text segments by using the at least a part of characters as separators; and decoding the plurality of text segments respectively.

18 Claims, 6 Drawing Sheets

```
00000000h: B4 B2 C7 B0 C3 F7 D4 C2 B9 E2 A3 AC D2 C9 CA C7 ; 床前明月光，疑是
00000010h: B5 D8 CF CB AA A3 AC BE D9 CD B7 CD FB C3 F7 D4 ; 地忏    俊吹 彡
00000020h: C2 A3 AC B5 CD CD B7 CB BC B9 CA CF E7 A1 A3 0D ; 拢  屯匪脊氏纭?
```
Lose Byte C9

Fig. 2b

METHOD AND SYSTEM FOR PROCESSING TEXT

CROSS-REFERENCE TO RELATED APPLICATIONS

This application claims the benefit of Chinese Patent Application No. 200910136952.5 filed 30 Apr. 2009 which is assigned to the assignee of the present application, and the teachings of which are hereby incorporated by reference in their entirety.

BACKGROUND

The present information relates to the information processing technology, and in particular, relates to a method and system for processing a text.

In the past more than 20 years, with the expeditious development of electronic technology, the performance and capacity of a computer network, particularly the Internet, have increased explosively. Users use computers to process and edit various kinds of information to form a great number of electronic texts every day. These electronic texts (hereinafter as the texts) comprise texts stored in a form of document and texts stored in a database in forms of recording and sheet. The information in these texts is important assets for a person or an enterprise. Storing and processing these texts in electronic forms such as documentation or records provides convenience for users to reuse the information therein and improves work efficiency.

However, in some cases, a text may be damaged (for example a text document is damaged) to thereby affect reuse of information in the text, which wastes resources (such as time, etc.) inputted when forming the text. There are various reasons for damage of a text, for example, communication failure, memory medium fault, etc. Besides, fault in the operational system (OS) and applications for processing documents would also damage a document. Document damage can be decreased to the minimum, but cannot be prevented completely.

When a document is damaged, the user typically wishes retrieving the undamaged part from the document, thereby eliminating the necessity to re-edit the whole document content. For a document of word processing type, text is always the most important content therein, whereas the format and other non-text information are relatively insignificant. Thus, it is important to restore the text in the document. Text is typically stored in the form of character codes in a document according to a predetermined character set.

A character set refers to a set of specific characters and is categorized into a single-character set (a single-byte coded character set) and a multi-character set (double-byte or multi-byte coded character set). The single character set mainly comprises coded character sets such as ASCII and Latin-1, mainly for alphabetical languages such as English and among others. The multi-byte character set mainly comprises coded character sets such as GB2312, GBK, GB18030, Shift-JIS, ISO2022 and among others, mainly for Chinese, Japanese, and Korean, etc. For the Windows of Microsoft, its core is coded by UTF-16, which is a double-byte code, and its outer-layer application varies with the language settings (locale) in use. For example, the Chinese windows may uses GB2312 codes or GB18030 codes.

A database for storing information may also use different codes. During installation, the database system software may set a default code, but upon setting up different databases, the code can be designated as required by the user. Upon installation of the database system software, for example, two database are established, one being for processing employee information, and one being for processing machine equipment information. The employee information may use GB2312 codes or UTF-16 codes so as to support Chinese, or use Shift-JIS codes so as to support Japanese. The machine equipment information may use ASCII codes, because information such as the names and IP addresses of the machine equipment are all ASCII codes.

One important reason for document damage is loss of bytes. Documents stored in a hard disk or U-disk, due to unexpected factors such as vibration and complex environment, some bytes of the document will be damaged, thereby causing loss of bytes.

Copying a document between databases, especially between databases using different codes, may also cause loss of bytes. For example, if data overflow occurs in the copy buffer, loss of bytes may occur. For a plurality of cooperative servers of a multinational company, since they are required to support English, Chinese, Japanese and Korean users in different countries, the documents therein use single-byte codes and double-byte or multiple-byte codes. Upon synchronization or backup between such cooperative server systems, improper method will cause overflow, and thus bytes may lose. For example, for a database using multi-byte codes, the number of coded bytes for each character is 1 to 3. When a string of characters are copied, a 512-byte buffer area is used. When the buffer area is full, due to program design problem or memory distribution problem, the last character may not be completely copied, i.e. loss of bytes. For example: for the words "ABC 中国"", if ABC each is single-byte coded, they will occupy 3 bytes, and the two words 中国" is three-byte coded and thus they each need to occupy three bytes. If the above encoded "ABC 中国" " is stored in the last 8-byte space, the last byte for the last character will lose.

Format conversion between different document formats or data formats, especially format conversion for a content including a text between different encoded systems or applications, may cause loss of bytes.

Due to development of hardware and software technologies and many years' use of computer to process various kinds of information, some enterprise users may accumulate various kinds of different documents which are based on different software and hardware systems. Since the scenarios required to be processed are complex, during the process of re-using these accumulated documents, loss of bytes in the text occur frequently.

Thus, it is necessary to adopt technical processing measures for the above different scenarios so as to try best to restore the damaged text. Moreover, a mechanism is needed to detect whether processing a text is safe to the text.

BRIEF SUMMARY

In view of the drawbacks in the prior art, the present invention provides a method for text processing, comprising: determining at least a part of characters in a text; dividing the text into a plurality of text segments by using the at least a part of characters as separators; and decoding the plurality of text segments, respectively.

The present invention further provides a system for text processing, comprising: a character determining module for determining at least a part of characters in the text; a text segment dividing module for dividing the text into a plurality of text segments by using the at least a part of characters as separators; and a decoding module for decoding the plurality of text segments, respectively.

The above method and system for text processing can divide a text into a plurality of segments, and then decode each segment, respectively. In this way, if the text has unrecognizable codes, they can be effectively isolated.

BRIEF DESCRIPTION OF THE SEVERAL VIEWS OF THE DRAWINGS

FIGS. 2a and 2b show diagrams of a text before and after having un-recognizable codes.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In the description of the embodiments of the present invention, a character can be one or more of letter, character or punctuation. In the case of Japanese, characters in a text may be one or more of letter, hiragana, katakana, and Chinese character.

Figure 1:
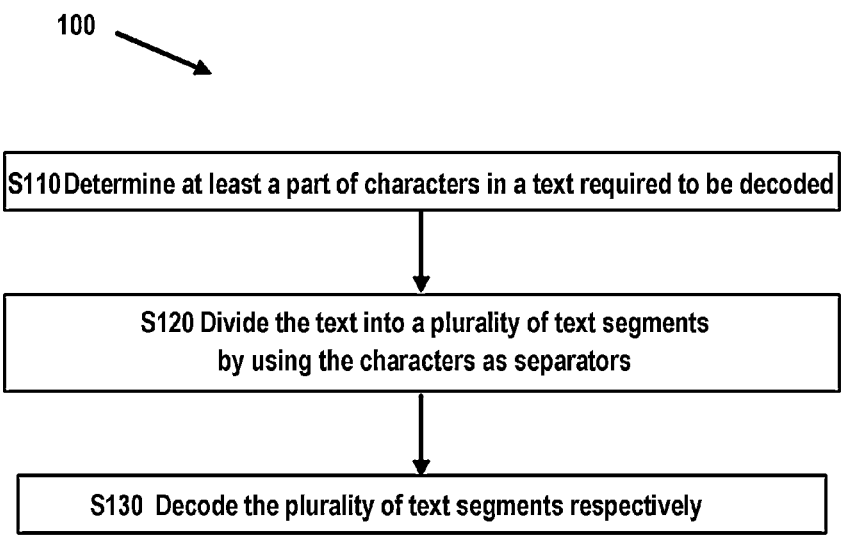
FIG. 1 shows a flow chart of a method for processing a text according to an embodiment of the present invention.

FIG. 1 shows a flow chart a method for processing a text according to an embodiment of the present invention, wherein a method 100 for decoding a text is shown. At step S110, firstly, it is necessary to determine at least a part of characters in the text which needs to be decoded. The characters in the text can be determined based on the codes of the characters. For example, the characters in the text can be identified through the codes of the characters, and the positions of the characters in the text are recorded. For example, the GB2312 code for "的" is 0xB5 0xC4. Based on the code, a plurality of "的" in the text can be identified, with the storage position of each "的" in the text being recorded. Wherein, the at least a part of characters may be at least a part of punctuations. At least a part of punctuations in the text can be determined through the codes of the punctuations. For example, at least a part of punctuations in the text can be identified through the codes of the punctuations, and the position of each punctuation in the text is recorded. For example, the GB2312 codes for commonly-used punctuations are as follows:

| Punctuations | GB2312 Code |
|---|---|
| , | 0xA3 0xAC |
| 。 | 0xA1 0xA3 |
| ; | 0xA3 0xBB |
| ! | 0xA3 0xA1 |
| : | 0xA3 0xBA |
| ? | 0xA3 0xBF |
| 、 | 0xA1 0xA2 |

FIG. 2 shows a diagram a text before and after occurrence of unrecognizable codes, wherein FIG. 2a shows a segment of text which uses GB2312 codes and its decoding result. Wherein, the code for each Chinese character uses two bytes. For example, the code for "床" is 0xB4 0xB2, the code for "前" is 0xC7 0xB0, the code for "上" is 0xC9 0xCF, the code for the punctuation "," is 0xA3 0xAC, and the code for the punctuation "。" is 0xA1 0xA3. FIG. 2b shows that after occurrence of loss of bytes, the text which loses the bytes will have unrecognizable codes, wherein the first byte 0xC9 for "上" is lost, which causes unrecognizable codes for the subsequent text starting from "上", i.e. the scope of unrecognizable codes is expanded. The skilled in the art would appreciate that if a text has extra bytes, for example one extra byte, unrecognizable codes also occur.

According to the embodiment of FIG. 1 of the present invention, punctuations act as separators to divide a longer segment of text into a plurality of shorter text segments. Then, each text segment is decoded respectively. In this way, unrecognizable codes in one text segment will not affect decoding of other text segments. Thus, a part of punctuations can be selected as required. For example, only comma "," and dot "。". If there are many damaged bytes in a text, a plurality of punctuations can also be selected so as to divide the text into more text segments, for example selecting 7 punctuations as listed in the above table. Different punctuation selection schemes can also be determined so as to divide the text by different ways into a plurality of text segments.

For using the above 7 punctuations, the probability for occurrence of punctuation selection error in a damaged text can be estimated with the following formula, which is about 0.54%, i.e.

$$7/(0xff-0xa0))^2 \times 100\% = 0.54\%$$

The formula illustrates the probability of wrong identification of punctuations. Since the above decoding method is to correct unrecognizable codes through identifying the punctuations, it is necessary to measure the probability of correctly identifying the punctuations.

Hereinafter, the probability will be calculated with the Chinese GB2312 character set as an example. The code table of GB2312 is shown in http://ash.jp/code/cn/gb2312tbl.htm, which has 6763 characters in total, from 0xA1 0xA0 to 0xFE 0xFF. Suppose it is necessary to identify the commonly-used 7 punctuations ", 。; ! : ? 、", then the probability of wrong identification can be estimated through the above formula.

The scenario for occurrence of wrongly identifying punctuations is possibly: two Chinese characters, Chinese character 1 and Chinese character 2, two Chinese characters being immediately adjacent, and the second byte of the Chinese character 1 being a first byte of a certain punctuation, and a first byte of the Chinese character 2 being a second byte of a certain punctuation. The probability for occurrence of such scenario can be calculated as follows:

wherein, a byte has a value from 0 to OxFF, except the value 0–0xA0 which is not present in Chinese, thus each byte can take a value 0xFF–0xa0; and only when the value is one of the 7 punctuations, is error likely to occur. Thus a byte having this situation is 7/(0xff–0xa0). Since each character is composed of two bytes, multiplying the two will obtain $(7/(0xff-0xa0))^2 \times 100\% = 0.54\%$. If considering the practical probability of adjacency of the above Chinese character 1 and Chinese character 2 in the context, then the probability of wrongly identifying the punctuations is much less.

If only two most common punctuations "," and "。" are used, the probability of wrong selection of punctuations is about 0.04%. As stated above, if considering the practical probability of adjacency of the above Chinese character 1 and Chinese character 2 in the context, then the probability of wrongly identifying the punctuations is much less. Thus, using punctuations as separators can effectively isolate influence of unrecognizable codes.

At step S120, the at least a part of characters are used as separators to divide the text into a plurality of text segments. For example, the punctuations as separators are used to divide the text into a plurality of text segments. After determining the at least a part of punctuations in the text, the partial text between two punctuations will become a text segment that can be decoded individually. The partial text between two punctuations can be taken as a text segment based on the identified at least a part of punctuations and their corresponding position in the text. As shown in FIG. 2, if punctuations "," and "。" are selected as separators, then the text can be divided into 4 text segments. In this way, the unrecognizable codes in each text segment will not affect other text segments, i.e. the scope of unrecognizable codes is narrowed through isolation. The skilled in the art would appreciate that, the purpose of determining punctuations in a text is to use the punctuations as separators to divide the text into a plurality of text segments. Thus, as mentioned above, different quantities of punctuations can be determined as required. For example, several commonly-used punctuations, or more frequently-used punctuations in the text, can be selected. Wherein, at least a part of punctuations may include ","  "。" ","  ":" "!" "?" or "". The policy for determining the text segments can also be further determined after determining the punctuations.

At step S130, the plurality of text segments are decoded respectively. Due to taking punctuations as separators, the influence of unrecognizable codes can be effectively isolated. Thus, the result of decoding a damaged text according to the present embodiment is apparently advantageous to the result of decoding by the prior art. To process the text in FIG. 2b according to the method of the embodiment of FIG. 1, the following decoding result can be obtained, wherein the character that cannot be determined are replaced with blank.

"床前明月光，疑是地纤，举头望明月，低头思故乡 。"

Apparently, the scope of unrecognizable codes is restricted in a text segment by isolated with punctuations as separators. The other text segments are correctly decoded.

The method for decoding the text can be adapted to a text comprising double-byte coded characters or multi-byte coded characters. The text can be selected from one of Chinese text, Japanese text or Korean text. The text can also be a text in other language comprising double-byte coded characters or multi-byte coded characters.

According to another embodiment of the present invention, the method is for decoding and displaying a damaged text comprising double-byte coded characters or multi-byte coded characters.

Those skilled in the art would appreciate that, for a text included in a database or a document in other format (for example, text in a PowerPoint or in a sheet), the text therein can be read by the corresponding method, and then the text is decoded.

Figure 3:
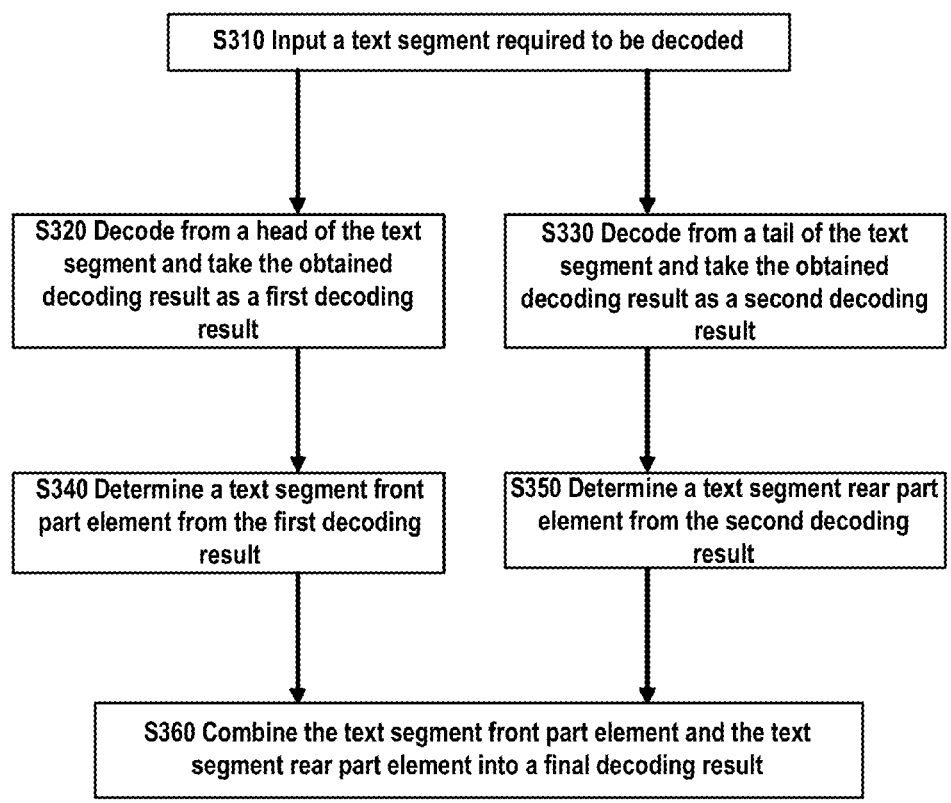
FIG. 3 shows a flow chart of a process for coding a text segment according to another embodiment of the present embodiment.

FIG. 3 shows a flow chart of a process for decoding a text segment according to another embodiment of the present invention. At step S310, a text segment which needs to be decoded is inputted. At step S320, decoding is carried out from the head of the text segment, and the decoding result derived is taken as the first decoding result of the text segment. At step S330, decoding is carried out from the tail of the text segment, and the decoding result derived is taken as the second decoding result of the text segment.

In the case that there is a programmer participating in repairing the damaged document, the first decoding result and the second decoding result can be displayed to the programmer. The programmer can determine how to process the above first decoding result and second decoding result based on the practical context, so as to obtain the final decoding result.

In the case that the computer automatically repairs the damaged text, the following steps can be continuously implemented to determine the final decoding result. At step S430, the front part elements of the text segment are determined from the first decoding result. At step S350, the rear part elements of the text segment are determined from the second decoding result. As to the text segment which has unrecognizable codes, in the first decoding result, the part after occurrence of unrecognizable codes may be a string of words which have no semantic meaning or rules, and the part before occurrence of unrecognizable words may be a plurality of words which have semantic relationship. In the second decoding result, the part before occurrence of unrecognizable characters might be a string of words which have no semantic meaning or rules, and the part after occurrence of unrecognizable words may be a plurality of words which have semantic relationship. In this way, the front part elements and the rear part elements of the text segment can be determined based on the semantic relationship. For example, the segmentation technology as described hereinafter can be adopted to determine the front part elements and the rear part elements of the text segment from the first decoding result.

At step S360, the front part elements of the text segment and the rear part elements of the text segment are combined into the final decoding result of the text segment, wherein the front part elements of the text segment which have the maximum existence possibility can be determined from the first decoding result; and the rear part elements of the text segment which have the maximum existence possibility can be determined from the second decoding result.

To determine the front part elements of the text segment which have the maximum existence possibility and to determine the rear part elements of the text segment which have the maximum existence possibility from the second decoding result, a plurality of text or sentence analysis methods in the prior art can be used. For example, the segmentation technology can be used to determine the first half part and the second half part of the maximum existence possibility. When several consecutive words cannot constitute a proper phrase, the possibility of the several words as effective elements of the text segment will be lowered, and based on such possibility, the front part elements and the rear part elements of the text segment can be determined respectively.

Take the sentence "中国航天官员应 邀到美国与太空总 署官员开会" as a fit example, if the last half byte of "与" is lost, then the first decoding result is:

"中国航天官员应 邀 到美国犹玭兆苁 悄僵笨蓿帷

And the second decoding result is (read from right to left):

会开 员官 署总空太 庙坪赖客蓐ь 急佨 旌焦

Wherein, segmentations can be derived, for example, 中国航天官员 , 应 , 邀 , 到美国 , 太空总署 , 官员 , 开会 . Thus, combination of the first half portion derived from the first decoding result and the last half portion derived from the second decoding result becomes the improved decoding result, wherein the unrecognizable code is identified by blank.)

"中国航天官员应 , 到美国 太空总署官 , 员开会

The segmentation technology belongs to a natural language processing technology. For a sentence, the computer determines which are words and which are not by the corpus knowledge, and the processing procedure is just a segmentation algorithm. This technology has been widely applied in fields such as speech recognition, intelligent translation, and search engine.

One kind of segmentation method is called character string matching segmentation method, or mechanical segmentation method, which carries out matching the Chinese character string to be analyzed to entries in a "sufficiently large" machine dictionary based on a specific policy. If a string is found in the dictionary, the match is successful (i.e. a word is identified). By different scanning directions, the string matching segmentation method can be categorized into direct match and reverse match; by different lengths of priority matching, it can be categorized into maximum (longest) match and minimum (shortest) match; and by whether to combine the part of speech marking process, it can also be categorized into a pure segmentation method and an integral method combining the segmentation with the marking. The several commonly-used mechanical segmentation methods are for example: 1) direct maximum matching method (the left-to-right direction); 2) reverse maximum matching method (the right-to-left direction); and 3) minimum segmentation (making the number of phrases segmented in a sentence the minimum).

The above different segmentation methods can be combined mutually. For example, the direct maximum matching method can be combined with the reverse maximum matching method to form a bi-directional matching method. Due to the characteristics of forming phrases from Chinese single characters, the direct minimum matching and the reverse minimum matching are typically rarely used. Generally speaking, the segmentation precision of reverse matching is higher than the direct matching, and ambiguous phenomenon less likely occur. Statistics shows that the error ratio for purely using the direct maximum match is 1/169, and the error ratio for purely using the reverse maximum match is 1/245. In a practically used segmentation system, mechanical segmentation can be used as a preliminary segmentation means, and then the segmentation precision ratio can be further improved by using various kinds of other language information.

For example, one segmentation method is to improve the scanning manner, which is called characteristic scanning or mark segmentation. It preferably identifies and segment out some words with prominent characteristics from a to-be-parsed string, and then with these words as breaking points, the original string can be divided into smaller strings for further mechanical segmentation, thereby reducing the matching error ratio. The other method is to combine the segmentation with the part of speech marking, which uses abundant part of speech information to help segmentation decision, and in the marking process, it turns to check and adjust the segmentation result, thereby greatly improving the segmentation precision ratio. For the mechanical segmentation method, a general module can be set up. There are many prior art in this aspect, which will not be detailed here.

According to a further embodiment of the present invention, the text processing method as shown in FIG. 1 is applied to a text segment comprising double-byte coded characters. The decoding method of FIG. 1 may further comprise: determining whether the number of bytes included in the double-byte coded text segment is odd. For a double-byte coded text segment, the number of bytes included therein should be even. If the number of bytes included in the text segment is odd, it shows that there might be byte loss. In an actually damaged text, byte loss is very common, whereas the situation of extra bytes is very rare. If the number of bytes included in the text segment is odd, decoding can be carried out from the head of the text segment to the tail, the result of which is the first decoding result; and it can also be carried out from the tail of the text segment to the head, the result of which is the second decoding result.

According to a still further embodiment of the present invention, decoding can be improved further based on the single-byte characters included in the text, for example ASCII coded characters, for example improving the decoding method of FIG. 1. Firstly, whether a text segment includes single-byte characters, for example, ASCII coded characters. If the text segment includes an ASCII coded character, the ASCII coded character can be used as a separator to further divide the text segment into two sub-text segments, and then decoding is carried out to the two sub-text segments respectively.

Since single-byte characters have no problem of unrecognizable codes, in the case of loss of bytes for data combining double bytes and multiple bytes, a single-byte character can act as a synchronization factor. Here, synchronization means that regardless of decoding from which position, the decoding program can decode a sting of codes correctly. Non-synchronization means the decoding program has to decode a string of codes from the first byte, not from the middle, otherwise, error likely occurs.

ASCII codes compatible issue would be considered in establishing the coding standards for a character set. The internal code range for ASCII codes is 0-0x79, thus the other character set generally avoids 0-0x79 and selects a value in 0x80-0xFF for decoding. For example, when the decoding program reads "I" character in IBM, it will identify the character based on the ASCII code and then the character can be correctly coded. Thus, the unrecognizable code in the text before I, if there is one, will not affect decoding the text following I. In other words, the scope of unrecognizable codes will stop at I character and will not continue further, and thus the ASCII coded character acts as a synchronization factor.

Figure 4:
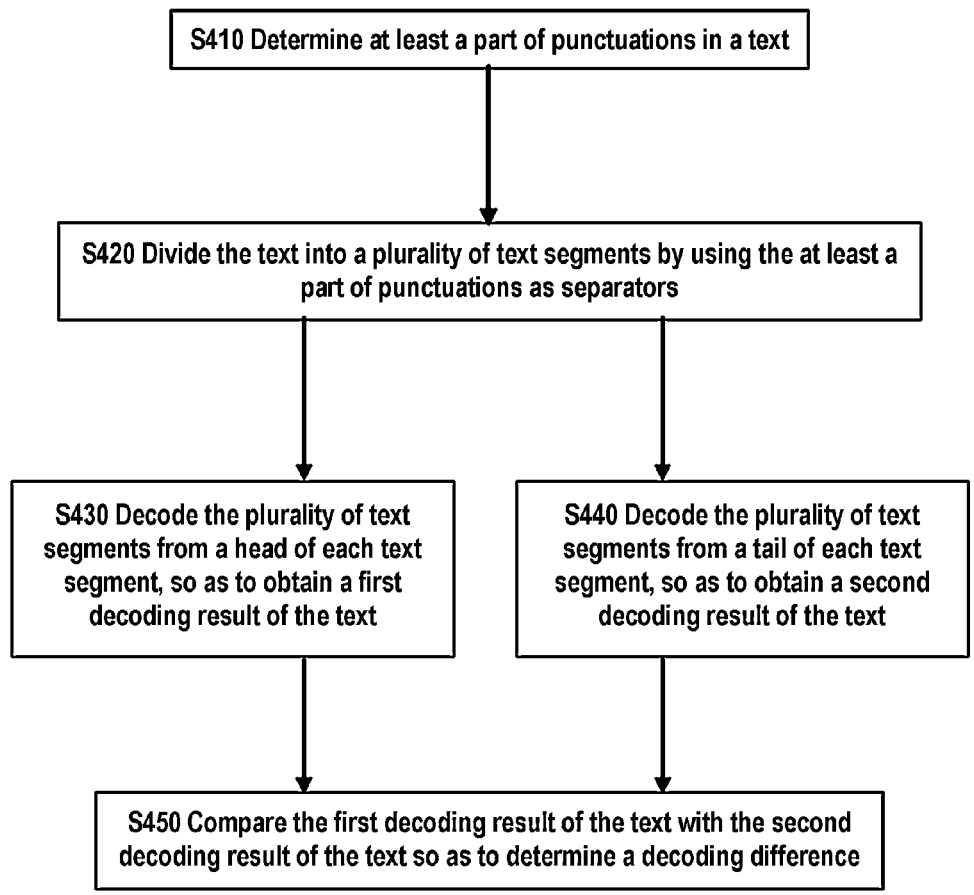
FIG. 4 shows a flow chart a process for processing a text according to further embodiment of the present invention.

FIG. 4 shows a flow chart of a process for processing a text according to a further embodiment, wherein the method is adapted to determine whether the text is damaged and its damage degree. Thus, the method of the present embodiment is further adapted to detect whether a predetermined processing to a text will damage the text.

Wherein, for a to-be-processed text, at step S410, at least a part of punctuations in the text are determined. At step S420, the at least a part of punctuations are used as separators to divide the text into a plurality of text segments. At step S430, decoding the plurality of text segments is carried out from the head of each text segment so as to derive a first decoding result of the text. At step S440, decoding the plurality of text segments is carried out from the tail of each text segment so as to derive a second decoding result of the text. At step S450, the first decoding result of the text is compared with the second decoding result of the text so as to determine the decoding difference. If the first decoding result is identical to the second decoding result, i.e. the decoding difference is o, it can be determined that there are no unrecognizable codes, and it can be determined that the text is not damaged. If there is decoding difference, then in the first decoding result and second decoding result of the text, the scope of unrecognizable codes generated by the unrecognizable characters will be different, whereas the parts which have no unrecognizable codes are identical. Thus, the above decoding difference reflects the text damage degree. The larger the decoding difference is, the greater is the damage degree of the text. Thus, the text damage degree can be determined based on the decoding difference. A database system administrator can determine whether a text is damaged, and mark correspondingly the text based on the damage degree for further processing or management.

After performing predetermined processing to the text, if the decoding difference is 0, then it can be determined that the above predetermined processing is safe to the text. The larger the decoding difference, the less safe to the text is the above predetermined processing. For example, if a predetermined processing method has a bug and the processing system or processing program has defects to damage the normal operation capability (for example, a defect in the processing program or the processing potentially has a defect in an execution environment), the above method can be used for the predetermined text to determine the decoding difference. Use of the above method of determining decoding difference is to determine whether the final use state of the text has problems and the seriousness of the problems. For a scenario that there are many texts needing to be processed, using the above method of determining decoding difference to detect whether a text is damaged or to detect whether a predetermined processing method to a text will damage the text can identify some problems which cannot be identified by other methods or manual detection, thus it has a more prominent technical effect.

Figure 5:
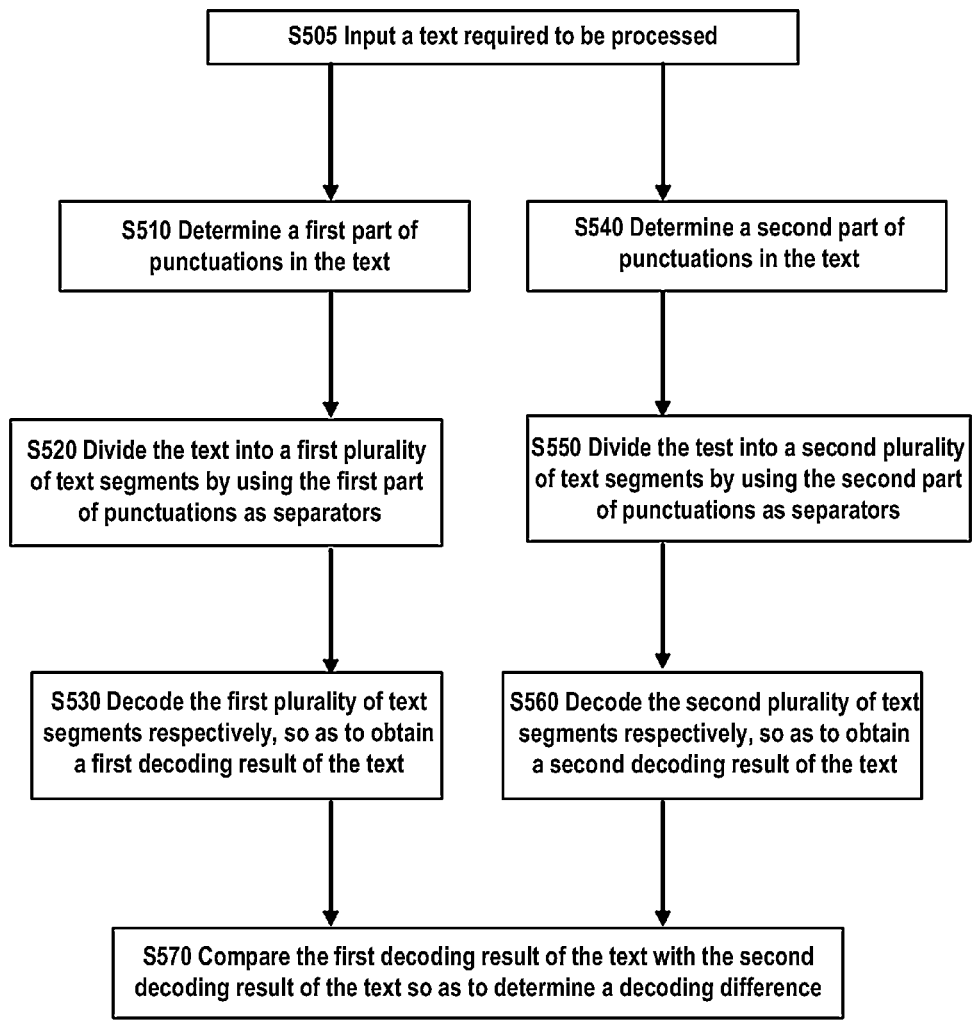
FIG. 5 shows a flow chart a process for determining text damage degree according to a still further embodiment of the present invention.

FIG. 5 shows a flow chart of a process for determining a text damage degree according to another embodiment of the present invention, wherein, at step S505, the text required to be processed is input. At step S510, a first part of punctuations in the text is determined. At step S520, the first part of punctuations are used as separators to divide the text into a first plurality of text segments. At step S530, the first plurality of text segments are decoded respectively to obtain the first decoding result of the text. At step S540, a second part of punctuations in the text are determined. The second part of punctuations can be different from or partially identical to the first part of punctuations. At step S550, the second part of punctuations is used as separators to divide the text into a second plurality of text segments. At step S560, decoding is carried to the second plurality of text segments respectively so as to obtain the second decoding result of the text. At step S570, the first decoding result of the text and the second decoding result of the text are compared to determine a decoding difference.

The skilled in the art would appreciate that the method of the above embodiment can be used for repairing a damaged document. It can also be used as a testing method to test whether a text processing method, for example a copy method between systems, is safe to the database text content or document content, whether it will cause byte loss to the text, and whether format conversion between different document formats or data formats, particularly format conversion between different encoding systems or applications, is safe to the text therein, for example, shifting a text or content of one business from a system to another system, copying from an application (a multi-byte code) to another application (another double-byte or multi-byte code).

The skilled in the art would appreciate, the above processing method of using punctuations as separators is also applicable for using other characters (for example common-used words with a high use frequency) as separator to process the text. For the case of using Japanese, the characters in the text may also be one or more of letter, hiragana, katakana, or Chinese.

Figure 6:
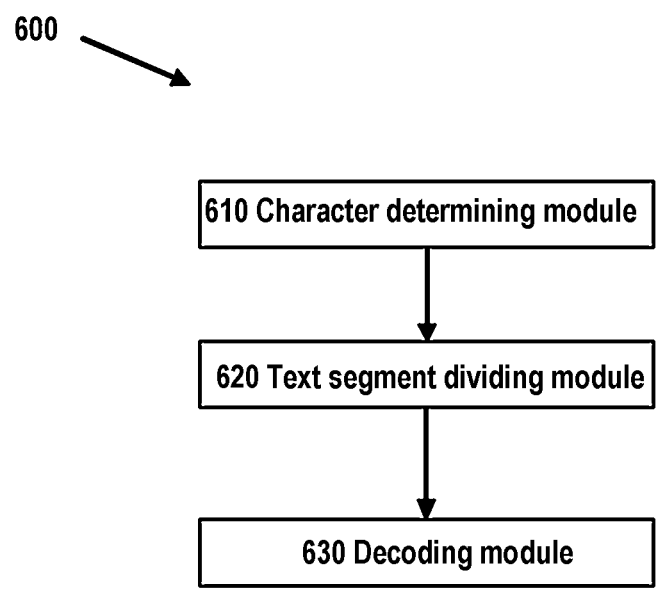
FIG. 6 shows a block diagram of a system for processing a text according to a yet further embodiment of the present invention.

FIG. 6 shows a block diagram of a system for text processing according to another embodiment of the present invention, wherein the system 600 for text processing comprises: a character determining module 610 for determining at least a part of characters in a text; a text segment dividing module 620 for dividing the text into a plurality of text segments by use of the at least a part of characters as separator; and a decoding module 630 for decoding the plurality of text segments respectively.

Wherein, the text may at least comprise one of double-byte coded characters and multi-byte coded characters, wherein the at least a part of characters can be at least a part of punctuations, and the character determining module 620 can be further configured to determine at least a part of punctuations in the text based on codes of punctuations.

Wherein, the decoding module 630 can be further configured to decode the plurality of text segments based on the first decoding method respectively to obtain a first decoding result of the text; to decode the plurality of text segments based on the second decoding method to obtain a second decoding result of the text. The system 600 may further comprise: a decoding difference comparison module for comparing the first decoding result of the text to the second decoding result of the text to determine a decoding difference.

Wherein, the decoding module 630 can decode the plurality of text segments from the head of each text segment respectively so as to obtain the first decoding result of the text; and the decoding module 630 can decode the plurality of text segments from the tail of each text segment respectively so as to obtain the second decoding result of the text.

Wherein, the decoding module 630 decodes the plurality of text segments respectively so as to obtain the first decoding result of the text. The system 600 can be further configured that: the character determining module 610 is further for determining other part of characters in the text; the text segment dividing module 620 is for dividing the text into a second plurality of text segments by use of the other part of characters as separators; and the decoding module 630 is for further decoding the second plurality of text segments to obtain a second decoding result of the text. The system 600 may further comprise a decoding difference comparison module to compare the first decoding result of the text to the second decoding result of the text to determine the decoding difference.

Wherein, the decoding module 630 can be further configured to decode from the head of a text segment backward, as a first decoding result of the text segment, and decode from the tail of the text segment frontward, as a second decoding result of the text segment.

Wherein, the text may comprise double-bytes coded text segments, and the system 600 further comprises: a byte number determining module for determining whether a number of bytes comprised in the double-byte coded text segment is odd. If the number of bytes included in the text segment is odd, the decoding module 630 can decode from the head of the text segment backward, as a first decoding result of the text segment, and the decoding module 630 can decode from the tail of the text segment frontward, as a second decoding result of the text segment.

Wherein, the system 600 may further comprise: a text segment front part elements determining module for determining the front part elements of the text segment in the first decoding result; a text segment rear part elements determining module for determining rear part elements of the text segment from the second decoding result; and an element combining module for combining the front part elements and the rear part elements into a final decoding result of the text segment.

Wherein, the system 600 may further comprise: a character determining module for determining whether a text segment comprises an ASCII coded characters. If the text segment comprises an ASCII coded character, then the text segment dividing module 620 can use the ASCII coded character as a separator to further divide the text segment into two sub-text segments, and the decoding module 630 can decode the two sub-text segments respectively.

Wherein, the above at least a part of punctuations may comprise "," "。" ";" ":" "!" "?" or ""; and the text may comprise at least one of Chinese text, Japanese text, and Korean text.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The invention claimed is:

1. A method for text processing, comprising:
   determining a plurality of characters in a text, wherein the text comprises double-byte coded characters;
   determining whether a number of bytes included in each text segment is even or odd;
   detecting which of the plurality of characters represent punctuations;

dividing the text into a plurality of different text segments using the detected punctuations as separators between the different text segments; and performing a plurality of discrete decoding operations, one for each of the plurality of different text segments, wherein one or more of the plurality of different text segments comprise at least one occurrence of unrecognizable codes that are unable to be successfully decoded as comprehensible characters without inferences being made, wherein decoding operations on text segments lacking unrecognizable codes are unaffected by other decoding operations on text segments including unrecognizable codes; and when performing the plurality of discrete decoding operations and only when the number of word segments included in one of the text segments is odd, decoding from a head of the text segment rearward, as a first decoding result of the text segment, and decoding from a tail of the text segment frontward, as a second decoding result of the text segment.

2. A method according to claim 1, further comprising:
determining a first part and a second part of punctuations in the text;
dividing the text into a first segment based on the first part of the punctuations and a second segment based on the second part of punctuations;
decoding the first segment to obtain a first decoding result of the text;
decoding the second segment to obtain a second decoding result; and
comparing the first decoding result to the second decoding result to determine a decoding difference.

3. A method according to claim 1, wherein each of the discrete decoding operations comprises:
decoding the text segment using a first decoding method, to obtain a first decoding result of the text; and
decoding the text segment using a second decoding method, to obtain a second decoding result of the text; and
comparing the first decoding result of the text segment to the second decoding result of the text segment, indicating a problem with decoding the text segment when the first decoding result differs from the second decoding result.

4. A method according to claim 1, wherein each of the discrete decoding operations comprises:
decoding the text segment from a beginning to an ending of each text segment to obtain a first decoding result; and
decoding the text segment from the ending to the beginning of the text segment to obtain a second decoding result; and
determining a decoding problem exists, when the first decoding result is different than the second decoding result.

5. The method of claim 1, further comprising:
when a decoding problem exists for a text segment and when each of the first decoding result and the second decoding result comprise unrecognizable characters:
adding to a combined result recognizable characters from the first decoding result from the beginning of the first decoding result until an unrecognizable character is detected in the first decoding result; and
adding in reverse order to the combined result characters from the second decoding result from the ending of the second decoding result until an unrecognizable character is detected in the second decoding result; and using the combined result as a decoding result for the text segment for which a decoding problem exists.

6. A method according to claim 1, wherein decoding operations performed for each of the text segments comprises:
decoding from a head of a text segment rearward, as a first decoding result of the text segment, and decoding from a tail of a text segment frontward, as a second decoding result of the text segment.

7. A method according to claim 1, further comprising:
determining a front part element from the first decoding result;
determining a rear part element from the second decoding result; and
combining the front part element and the rear part element into a final decoding result of the text segment.

8. A method according to claim 1, wherein the decoding operations performed for each text segments further comprises:
determining whether the text segment comprises an ASCII coded character;
when the text segment comprises an ASCII coded character, dividing the text segment further into two sub-text segments by using the ASCII coded character as a separator, and decoding the two sub-text segments using independent decoding operations.

9. A method according to claim 1, wherein the punctuations comprise at least one of ";" "." ":" ":" "!" "?" or "\"; and the text comprises at least one of Chinese text, Japanese text, and Korean text.

10. A system for text processing, comprising:
a character determining module for determining a plurality of characters in a text and for detecting which of the plurality of characters represent punctuations, wherein the text comprises at least one of double-byte coded characters and multi-byte coded characters;
a text segment dividing module for dividing the text into a plurality of different text segments using the punctuations detected by the character determination module as separators between the different text segments wherein the text segment dividing module is further configured to:
determine a first part and a second part of punctuations in the text;
divide the text in into a first segment based on the first part of the punctuations and a second segment based on the second part of punctuations; and
a decoding module for performing a plurality of discrete decoding operations on the text, one for each of the plurality of different text segments, wherein one or more of the plurality of different text segments comprises at least one occurrence of unrecognizable codes that are unable to be successfully decoded as comprehensible characters without inferences being made, wherein decoding operations on text segments lacking unrecognizable codes are unaffected by other decoding operations on text segments including unrecognizable codes, wherein the decoding module is further configured to:
decode the first segment to obtain a first decoding result of the text,
decode the second segment to obtain a second decoding result; and
compare the first decoding result to the second decoding result to determine a decoding difference.

11. A system according to claim 10, wherein the decoding module is configured to:

decode at least a portion of the different text segments using a first decoding method, to obtain a first decoding result of the text segment; and decoding the portion of the text segments using a second decoding method, to obtain a second decoding result of the text segment; and comparing the first decoding result of the text segment to the second decoding result of the text segment, indicating a problem with decoding the text segment when the first decoding result differs from the second decoding result.

12. A system according to claim 11, wherein the decoding module decodes the plurality of text segments from a head of each text segment, so as to obtain a first decoding result of the text; and the decoding module decodes the plurality of text segments from a tail of each text segment, so as to obtain a second decoding result of the text.

13. A system according to claim 10, wherein the system is further configured such that:

when a decoding problem exists for a text segment and when each of the first decoding result and the second decoding result comprise unrecognizable characters:

adding to a combined result recognizable characters from the first decoding result from the beginning of the first decoding result until an unrecognizable character is detected in the first decoding result; and adding in reverse order to the combined result characters from the second decoding result from the ending of the second decoding result until an unrecognizable character is detected in the second decoding result; and using the combined result as a decoding result for the text segment for which a decoding problem exists.

14. A system according to claim 10, wherein the decoding module is further configured to:

decode from a head of a text segment rearward, as a first decoding result of the text segment, and decode from a tail of a text segment frontward, as a second decoding result of the text segment.

15. A system according to claim 10, wherein the character determining module is further configured to:

determine whether the text segment comprises an ASCII coded character;

when the text segment comprises an ASCII coded character, divide the text segment further into two sub-text segments by using the ASCII coded character as a separator, and decoding the two sub-text segments using independent decoding operations.

16. A system according to claim 10, wherein the text comprises a double-byte coded characters, the system further comprising:

a byte number determining module for determining whether the number of bytes comprised in the double-byte coded text segment is odd; and only when the number of word segments included in the text segment is odd, decoding from a head of the text segment to the tail, as a first decoding result of the text segment, and decoding from a tail of the text segment to the head, as a second decoding result of the text segment.

17. A system according to claim 16, further comprising:

a text segment front part element determining module for determining the front part element of the text segment from the first decoding result;

a text segment rear part element determining module for determining the rear part element of the text segment from the second decoding result; and an element combining module for combining the front part element and the rear part element into a final decoding result of the text segment.

18. A method for text processing, comprising:

determining a plurality of characters in a text, wherein the text comprises at least one of double-byte coded characters and multi-byte coded characters;

detecting which of the plurality of characters represent punctuations;

determining a first part and a second part of punctuations in the text;

dividing the text into a first segment based on the first part of the punctuations and a second segment based on the second part of punctuations;

dividing the text into a plurality of different text segments using the detected punctuations as separators between the different text segments; and performing a plurality of discrete decoding operations, one for each of the plurality of different text segments, wherein one or more of the plurality of different text segments comprise at least one occurrence of unrecognizable codes that are unable to be successfully decoded as comprehensible characters without inferences being made, wherein decoding operations on text segments lacking unrecognizable codes are unaffected by other decoding operations on text segments including unrecognizable codes, wherein the performing of the discrete coding operations comprises:

decoding the first segment to obtain a first decoding result of the text;

decoding the second segment to obtain a second decoding result; and comparing the first decoding result to the second decoding result to determine a decoding difference.

* * * * *